(12) United States Patent
Seibt

(10) Patent No.: US 9,950,811 B2
(45) Date of Patent: Apr. 24, 2018

(54) VISUAL SIGNALLING OF AN AIRCRAFT

(71) Applicant: Airbus Operations GmbH, Hamburg (DE)

(72) Inventor: Christian Seibt, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 39 days.

(21) Appl. No.: 14/434,902

(22) PCT Filed: Oct. 10, 2013

(86) PCT No.: PCT/EP2013/071165
§ 371 (c)(1),
(2) Date: Apr. 10, 2015

(87) PCT Pub. No.: WO2014/057037
PCT Pub. Date: Apr. 17, 2014

(65) Prior Publication Data
US 2015/0232198 A1 Aug. 20, 2015

Related U.S. Application Data

(60) Provisional application No. 61/712,329, filed on Oct. 11, 2012.

(30) Foreign Application Priority Data

Oct. 11, 2012 (EP) ..................................... 12188236

(51) Int. Cl.
G08B 21/00 (2006.01)
B64D 47/02 (2006.01)

(52) U.S. Cl.
CPC .......... B64D 47/02 (2013.01); B64D 2203/00 (2013.01)

(58) Field of Classification Search
CPC ....................................................... B64D 47/02
(Continued)

(56) References Cited

U.S. PATENT DOCUMENTS 3,411,131 A * 11/1968 Hewes ..................... G08B 5/36
340/945
4,299,442 A 11/1981 Buckelew
(Continued)

FOREIGN PATENT DOCUMENTS

CN 1545462 A 11/2004
CN 102046470 A 5/2011
(Continued)

OTHER PUBLICATIONS

The People's Republic of China, Chinese Office Action for Chinese Patent Application No. 2015111001326280 dated Nov. 13, 2015.
(Continued)

Primary Examiner — Brent Swarthout
(74) Attorney, Agent, or Firm — Lorenz & Kopf, LLP

(57) ABSTRACT

This relates to an aircraft providing visual signalling of an aircraft. An aircraft for providing visual signalling is provided with at least one multifunctional light unit comprising at least one light source for outboard light emission, which unit is provided on sideway facing areas of the aircraft. The sideway facing areas comprise lateral facing sideway surface areas and/or forward and backwards facing surface areas of the aircraft. The at least one multifunctional light unit is configured to provide i) directional signalling of the aircraft, or ii) status signalling of the aircraft, wherein the status signalling relates to at least one of the group of status of the aircraft, status of the current flight mission, and status of the traffic situation; and/or iii) identification signalling of the aircraft.

15 Claims, 9 Drawing Sheets

(58) Field of Classification Search
USPC .......................................... 340/945, 971, 963
See application file for complete search history.

(56) References Cited

U.S. PATENT DOCUMENTS

| | | | |
|---|---|---|---|
| 4,916,445 A | 10/1990 | Crossley | |
| 5,813,744 A | 9/1998 | Altebarmakian | |
| 6,909,544 B2* | 6/2005 | Kolosowsky | G02B 27/281 349/16 |
| 7,095,318 B1* | 8/2006 | Bekhor | B60Q 1/503 340/464 |
| 7,596,899 B1* | 10/2009 | Michael | G09F 19/22 362/249.04 |
| 8,933,819 B1* | 1/2015 | Garrettson | B64D 45/00 340/945 |
| 2002/0196637 A1 | 12/2002 | Dubin et al. | |
| 2008/0048101 A1 | 2/2008 | Romig et al. | |
| 2008/0055285 A1* | 3/2008 | Ishikawa | G09F 21/045 345/204 |

FOREIGN PATENT DOCUMENTS

| | | |
|---|---|---|
| CN | 102121661 A | 7/2011 |
| JP | 2002341432 A | 11/2002 |

OTHER PUBLICATIONS

International Searching Authority, International Search Report for Application No. PCT/EP2013/071165 filed on Oct. 10, 2013.
European Patent Office, European Search Report for European Patent Application No. 12188236.9 dated Feb. 25, 2013.

\* cited by examiner

VISUAL SIGNALLING OF AN AIRCRAFT

CROSS-REFERENCE TO RELATED APPLICATIONS

This is a continuation of International Application No. PCT/EP2013/071165, filed Oct. 10, 2013, which application claims priority to European Patent Application No. 12188236.9, filed Oct. 11, 2012, and to U.S. Provisional Patent Application No.: 61/712,329, filed Oct. 11, 2012, which are each hereby incorporated by reference in their entirety.

TECHNICAL FIELD

This application relates to an aircraft providing visual signalling and a method for providing visual signalling of an aircraft

BACKGROUND

With respect to the operation of aircraft, for example airplanes, visual signals are provided in form of red and green lights provided at the tips of the wings, for example, for the identification of the orientation of the aircraft when the complete silhouette, i.e. the outer shape of the aircraft, cannot be clearly seen, such as in night time hours. The red and green lights are also referred to as position lights. Further, light points in form of beacons on the lower and upper side of the fuselage are used for marking an aircraft to be at least somehow visible during night time operation. Further, strobes, or stroboscope or strobe lights on the outer edges or tips of the wings are used for better visibility during misty or foggy weather conditions. For similar purpose, flashing white lights are used at the tail portion. For communicating and identifying detailed information about the aircraft, further communication means are used, such as radar, radio connection, and wireless telecommunication means and the like, for example between the cockpit and the tower of an airport. However, to retrieve this information, additional equipment is needed, such as receivers, walkie-talkies or mobile phones. Further, to provide information such as the operating airline, names and logos, or other forms of graphical elements are provided on the aircraft.

SUMMARY

There may be a need for improved and more detailed visual communication of aircraft-related information that is easy to implement.

It should be noted that the following described aspects of an embodiment apply to a aircraft providing visual signalling and the method for providing visual signalling of an aircraft.

According to a first embodiment, an aircraft providing visual signalling is provided. At least one multifunctional light unit comprising at least one light source for outboard light emission is provided on sideways facing areas of the aircraft. The sideways facing areas comprise lateral sideways facing surface areas and/or forward and backwards facing surface areas of the aircraft. The at least one multifunctional light unit is configured to provide at least one of i) directional signalling of the aircraft, wherein the directional signalling relates to at least one of a group of movements of the aircraft in an airborne state, and movements of the aircraft in an on-ground state; ii) status signalling of the aircraft, wherein the status signalling relates to at least one of a group of status of the aircraft, statuses of the current flight mission, and status of the traffic situation; and iii) identification signalling of the aircraft, wherein the identification signalling relates to at least one of a group of type and model of the aircraft, operating airline, flight number, and origin/destination.

The term "sideway facing" relates to portions of the aircraft's surface that are oriented such that they are visible, for example, from positions besides or alongside the aircraft, for example from the tower or the terminal when the aircraft is approaching the gate, or from other aircrafts in taxi or parking movements on the ground. The term "sideway" relates to all horizontal directions, such as sidewards or lateral, i.e. port and starboard, as well as to the front and the back, relating to normal operation or flight directions. For example, "sideway areas" of a fuselage structure relates to areas of the fuselage that connect upper and lower portions that face upwards and downwards respectively.

The expression "sideway facing areas" in relation to comprising lateral sideway facing surface areas and/or forward and backwards facing surface areas of the aircraft can thus also be referred to as "surface areas with a vertical extension component, e.g. vertical surface areas of the fuselage, or surface areas of the fuselage that extend at least in an oblique angle to the horizontal such that the surface areas are visible to other ground traffic participants such as to other aircrafts, i.e. crews in other aircrafts that are travelling on the ground or that are in a parking position on the ground, or to service vehicles moving on the ground of an airport, i.e. on the airfield or a manoeuvring area of the airport.

The expression "sideway facing areas comprising lateral sideway facing surface areas and/or forward and backwards facing surface areas of the aircraft" can also be referred to as vertically extending surface portions.

The expression "sideway facing areas comprising lateral sideway facing surface areas and/or forward and backwards facing surface areas of the aircraft" can also be referred to as lateral and front/edge surface portions.

Sideway facing areas may comprise surface areas of the fuselage structure, or the wings, e.g. upwardly oriented wing ends, such as winglets. Sideway facing areas may also comprise surface areas of the tail portions such as the vertical and horizontal stabilizers. In one example, winglets are provided with multifunctional light units on the side facing away from the fuselage, i.e. to the side of the aircraft.

The at least one multifunctional light unit turns the aircraft's surface, e.g. the fuselage into a human-machine-interface. The "directional signalling", the "status signalling", and the "identification signalling" is visible from other aircrafts, in the air or on the ground, and also by flight and airport operating staff, such as supply and maintenance personnel, and other persons watching the aircraft. Thus, "outboard light emission" implicitly means that the light is still visible by human eye at least in a distance of 10 meters or more, in particular in the surrounding of an airfield or terminal with a number of different light sources.

The term "outboard light emission" relates to a light emission for example visible from other users on an airfield, such as from other airplanes, from airport supply crews or even from the tower.

The term "outboard light emission" comprises light from direct and indirect emitting light sources that is directed away from the aircraft's respective surface and is thus visible from a location outside the aircraft, e.g. on the airfield or from the tower. For example, light sources are provided integrated in the light emitting surfaces for direct light emission. In another example, light sources are provided that illuminate light reflecting or light transmitting surfaces, wherein the reflecting or transmitting surfaces are visible and thus appear as the origin of the light emission. For example, light projections are provided to direct light towards a reflecting projection surface, which acts as the surface emitting light in a direction away from the aircraft.

The "directional signalling" may be provided alternatively or in addition to the signalling of the known position lights. The "directional signalling" comprises, for example, an indication of intended travelling, e.g. in the vicinity of the gates of an airport. The "directional signalling" may also comprise travelling indications during flight, or while travelling on ground on the airport, such as on the runway or on the way to/from the runway. For example, the travelling direction can be seen from others on the ground or in the air, even when the plane is currently stopping on the ground during taxi, for example. In particular, the tower can identify the travelling direction before it actually takes place. When the aircraft indicates a travel intention, via the human-machine-interface, it can easily be verified by the tower whether there is or will be a deviation from the predetermined route on the movement area of the airport. A deviation from the predetermined flight route may also be identified and indicated via the multifunctional light unit(s).

The "directional signalling" may also be provided in particular with movements in the area of the gates. For example, self-propelling aircrafts moving towards or away from the gate can indicate their intended travel direction via the multifunctional light unit(s) providing the human-machine-interface (HMI). For example, in case of motor-driven wheels of an aircraft, thus omitting the need for special pushing vehicles or pulling vehicles, vehicles in the vicinity are informed via the multifunctional light unit.

The "directional signalling" means, for example, movement or travel-related signalling of the aircraft in relation to other ground traffic on the airfield, such as in the area of the gates of an airfield.

The "status signalling" provides, for example, information about embarking or disembarking in progress, seating in progress or completed, waiting for flight permission in general, waiting for detailed airfield instructions by the tower, waiting for a takeoff slot, waiting for taxi to runway, waiting for supply services or supply in progress, cargo loading and unloading procedures, and the like. The "status signalling" may also relate to an airport flight schedule and an airline flight schedule, for example, a delayed aircraft can be visually identified to get prioritized when sorting a slot order for a number of aircrafts in a waiting position for takeoff.

The "status of the aircraft" relates to different operation steps or workflows, for which an aircraft is provided. The status of the aircraft indicates the current procedural step that is being carried out or operated, such as the boarding procedure, waiting phases, preparing phase for take-off, (taxi) travelling from gate to runway, starting procedure and takeoff, as well as landing, (taxi) travelling from runway to gate, waiting phases, preparing for docking at gate, preparing for de-boarding, and de-boarding.

The "status of the current flight mission" relates to different modes of operation and operation purposes in relation with the flight mission that the aircraft is being used for, such as on schedule or delayed, or in preparation for a certain procedure, nearly completed procedure, or completed procedure.

The "status of the traffic situation" relates to operational aspects related to the traffic on the airfield, i.e. the relation stop of the aircraft to ground movements by other vehicles. For example, the traffic situation comprises the indication of a parking position at a gate or a final destination on the airfield, or of a waiting position during different phases of travel, or of a preparation position for travelling, or of an actual travelling.

The "identification signalling" provides corporate identity and allows associating the particular aircraft with other aircrafts even in night or twilight times, for example, in addition to graphic design on the rudder, the fuselage, and the like. The "identification signalling" comprises certain colours and patterns of light elements of the multifunctional light unit(s) activated for the identification purpose. The "identification signalling" may also provide identification of the aircraft's manufacturer.

The "destination" relates to the destination of the current flight mission, i.e. the airport that the aircraft is travelling to, according to the schedule. The "destination" can also relate to a planned/scheduled destination of the upcoming flight mission, which has not started, yet. The "origin" relates to the airport from which the current flight mission has started, i.e. the airport where there aircraft has started before landing at the current position.

In another example, airline identification is provided by the at least one multifunctional light unit, for example, for the field of aircraft leasing or e.g. for chartered aircrafts. Thus, airline identification is provided constantly, while being adaptable, for example by projecting an airline's logo to the vertical stabilizer or rudder.

The at least one multifunctional light unit is provided in addition to signalling lights, such as green and red position lights on the outer edges or tips of the wings, beacons on the lower and upper side of the fuselage, or strobes on the outer edges or tips of the wings or the tail portion with flashing white light. The signalling lights are also referred to as position lights or navigation lights. The multifunctional light unit is also provided in addition to headlights and other spot lights, e.g. illuminating the runway, also referred to as taxi lights and landing lights or runway turnoff lights.

For example, multifunctional light units may flash, sparkle or show different (multi-) coloring, such as red and/or green, as known from port and starboard, indicating the direction of the aircraft.

The envelope structure is also referred to as the aircraft's outer skin. For example, the multifunctional light unit is located within the envelope structure (see also below).

The multifunctional light unit(s) on the sideway facing areas of the aircraft, e.g. on the fuselage structure, provide(s) additional communication of information relating to the aircraft, and can be seen from other aircrafts, control instances such as the tower, and other travelling vehicles and staff operating on airports or others.

According to an exemplary embodiment, the sideway facing areas of the aircraft with the at least one multifunctional light unit provide an adaptable graphical user interface as a communication interface of a human-machine-interface of the aircraft for providing an information exchange between the aircraft and a user located outside the aircraft.

The term "adaptable" refers to a visible structure that is capable of providing different displayed context, i.e. different graphical representations. The graphical user interface can thus provide different information. For example, the information can be varied or changed or adapted to the current situation. Hence, beside the on and off switching or dimming of the multifunctional light unit, the latter can be changed in the visual appearance to show different types of context as indicated above.

A wireless data connection may be provided from the external (i.e. located outside) user to the aircraft, for example to the cockpit or a flight crew area. The data connection may provide speech radio service.

The graphical user interface may be a unidirectional communication interface, and the data connection may be a further unidirectional communication interface, or a bidirectional communication interface. The human-machine-interface provides information from the aircraft and also provides information to the aircraft, for example by a further interface such as radio connection or data connection.

For example, the at least one multifunctional light unit is activatable as a graphical user interface for indicating cabin status and/or results of test programs monitoring functionality of the aircraft, such as avionic functionality, or functionality of passenger service, cabin equipment or elements, or cargo related equipment. The cabin status may relate to system status or cleaning status of the cabin.

For example, the at least one multifunctional light unit may be activated via remote control.

The multifunctional light unit may be used for indicating the approximate location of a problem or issue detected by a test monitoring program.

For example, the multifunctional light unit is integrated in the edge portion of a movable door panel and/or the frame portion of the door opening in the envelope structure. In another example, the multifunctional light unit is integrated into the window structure of windows in the fuselage. The provision of a multifunctional light unit accentuating the door(s) and/or window(s) of an aircraft may facilitate the steering of a docking finger when parking the aircraft at the gate for loading and unloading of passengers.

According to an exemplary embodiment, the aircraft has a fuselage structure, and the visual signalling is provided on the outside of the fuselage structure of the aircraft.

For example, the visual signalling is provided directly on the outer surface of the fuselage. In another example, the visual signalling is provided by light sources integrated into the outer skin such that the visual signalling is provided by the outer surface of the fuselage.

According to an exemplary embodiment, the information provided by the visual signalling is perceptible on the outer surface of the fuselage structure.

In an example, the visual signalling provides a light pattern as information in the outer layer of the fuselage structure, i.e. the information is provided on the fuselage such that a user can perceive the information, i.e. recognise it on the fuselage. A further projection surface away from the fuselage is not provided in such an example.

The term "perceptible" means that the information is visible and can be recognized or identified on the outer surface of the fuselage structure.

According to an exemplary embodiment, the aircraft comprises a fuselage structure, and the sideways facing areas of the aircraft are sideways areas of the fuselage structure, wherein the sideway areas comprise lateral sideway facing surface areas and/or nose-tip sideways areas of the fuselage structure.

According to an exemplary embodiment, the sideways facing areas of the aircraft are window areas of the fuselage structure. The window areas comprise cabin and/or cockpit windows and areas between adjacent windows and adjacent areas below and above the windows.

For example, the adjacent areas below and above the windows comprise fuselage areas with an orientation of at least 15° or 30° inclination to the horizontal direction. The inclination direction relates to a normal operating state of the aircraft when positioned on the ground.

According to an exemplary embodiment, the fuselage is provided with a plurality of windows and/or doors, and at least one of the windows and/or doors is provided with at least one of the at least one multifunctional light unit(s).

A number of (adjacent) windows may be provided along the side of the aircraft, which are equipped with a multifunctional light unit each. The fuselage may be provided with a plurality of window components, and the at least one multifunctional light unit is formed integrally with one of the window components.

The at least one multifunctional light unit may also be located within the envelope structure.

The fuselage provides an envelope structure enclosing usable space onboard the aircraft. The enclosed "usable space" comprises cabin space, cockpit space or storage space. The enclosed usable space may also comprise a cooling storage space, where the multifunctional light unit indicated temperature inside the cooling storage space.

The term "window" refers to not only the opening through which light travels between the outside and the inside of the fuselage, but also to the surrounding structural components, such as the frame and attachment surfaces of the edge surrounding the opening in the outer skin for the insertion of the window. The term "window" also refers to an opening in the envelope structure for permitting the transmission of light, i.e. the "opening" is a structural change in the outer skin, where the opaque skin, for example a multilayer laminate construction, is provided with a cut-out or hole, in which a transparent or translucent component is inserted. The term "window" also refers to the constructional elements that are necessary to form the opening for the light transmission; for example, for the entry of daylight into a cabin space or providing a view from the inside to the outside. The term "window" thus also refers to the windowpane(s), frames, and structural edges of the fuselage, i.e. outer skin, providing a mounting or support structure for the window frame.

The expression "located within the envelope structure" refers to the location of the multifunctional light unit (MLU) at least on the inside of a cover skin or cover layer forming the outer skin of the fuselage. Thus, the multifunctional light unit is protected from the harsh environment that can occur during the operation of an aircraft. The opposite would be the attachment of a light on the outside of the fuselage, i.e. mounted on top of the outer surface. Further, in an example, the multifunctional light unit(s) is (are) located on the outside, wherein cover means are provided for protecting the light source.

Each window comprises an edge frame section of the outer skin surrounding an opening in the outer skin, a window frame inserted in the edge frame section, and a windowpane arrangement mounted to the window frame enclosing the opening in the outer skin. The term "window" thus relates not only to the part providing the primary function seeing through, i.e. the "free" windowpane mounted in the frame and cover elements; the term "window" also comprises the frame parts and the opening edge in which the frame is fixedly mounted.

It is explicitly noted that the term "window" also relates to a door as an opening in the fuselage outer skin structure. The fuselage structure may thus also comprise at least one door, which door is also provided with a multifunctional light unit.

The term "aircraft" comprises airplanes, for example passenger and cargo airplanes, military airplanes, helicopters for civil and military use, and airships.

The multifunctional light unit may be integrated in the window assembly, or window member or window component, that enables mounting the multifunctional light unit without further modification of the aircraft structure, i.e. in particular the aircraft's outer skin. The integration of window structures allows the use of existing aircraft structures, such as the fuselage with window insertion portions in the outer skin. Thus, the windows, i.e. the components, will be adapted for the integration of the at least one multifunctional light unit. The structural parts of the fuselage may remain, i.e. they are not further modified, for example. The windows may be adaptable to an additional function, namely to provide light as described above.

In another example, the fuselage with its insertion openings in the outer skin is modified for additional interference, i.e. alteration, and adapted for receiving multifunctional light units.

According to an exemplary embodiment, the at least one multifunctional light unit is provided and follows at least a part of a contour of the respective window.

The at least one multifunctional light unit thus accentuates the contour of the window, i.e. the at least one multifunctional light unit retraces at least a part of the contour, for example, the contour of one or more cockpit windows or one or more cabin windows. The multifunctional light unit may also follow the complete contour of the respective window or door.

In one example, the windows comprise cockpit windows and cabin windows; and the cockpit windows and/or at least a part of the cabin windows are provided with a multifunctional light unit.

According to an exemplary embodiment, the multifunctional light unit is integrated in a window construction, wherein the at least one light source is provided at least behind an outer windowpane, and wherein the at least one light source is provided in a circumferential frame area.

The term "integrated" relates to a constructional combination of the window construction and the constructional arrangement of the multifunctional light unit. The construction of the multifunctional light unit is thus combined and arranged within the construction of the window. The "window construction" relates to the constructional means necessary for placing and holding the window pane(s) in the opening provided in the fuselage. Hence, the window construction comprises various frame parts, support parts, sealings, clamps, as well as the window pane(s) itself, just to name a few components. The multifunctional light unit, in particular a light source, is arranged within this construction, which construction, in one example, is adapted slightly to integrate the multifunctional light unit.

The light source may be provided in a part of the circumferential frame area, or may be provided along the complete circumferential frame area.

In one example, the at least one light source is provided between an outer windowpane and an inner windowpane.

The light source can thus be arranged in existing constructions. The arrangement in the outer edge portions means only minimum distortion, i.e. reduction for the see-through area of the window. The light source can thus be arranged in a way that it is invisible to the passenger or crew member inside the aircraft looking through the window to the outside. Due to the integration in existing windows, separate openings in the skin, which may be considered as vulnerable points in the fuselage, are not needed.

The multifunctional light unit can thus be mounted during retrofitting, for example when the windowpanes are replaced, e.g. in two- or three-years interval, or when the inner pane facing towards the passenger is replaced.

In the case of two windowpanes, the at least one light source is provided in-between the two panes. In the case of three windowpanes, the at least one light source may be provided between the outer and the middle pane, or between the middle and the inner pane.

According to an exemplary embodiment, an intermediate frame structure is provided between the fuselage structure and a window frame. The multifunctional light unit is provided in the intermediate frame structure.

The intermediate frame structure permits maintaining the multifunctional light unit when replacing windowpanes, for example. Further, the intermediate frame structure can be provided with a compact cross-section to reduce the free area for light transmission to a minimum while using the same opening size in the outer skin. When the effective window size is to be maintained, the intermediate frame structure requires a minimum of additional opening size in the outer skin.

According to an exemplary embodiment, a photovoltaic element is provided that is integrated in the window construction for energy supply of the multifunctional light unit.

An independent power supply is suitable in particular for retrofitting, since no separate supply lines have to be installed. A wireless and/or wire data connection for controlling the multifunctional light unit may be provided.

For example, a photovoltaic (PV) element is provided on the inner frame or window funnel portions, and/or on an outer side of a shading element of the window opening. An energy storage e.g. a rechargeable battery may be provided for storing electric energy provided by the PV element.

According to an exemplary embodiment, optional reflector means are provided for preventing in board light emission.

The reflector means can be provided as optical structures in the edge sections of the windowpane covering the multifunctional light unit. The reflector means can be provided as reflector stripes in the space between the panes in a multi-pane window.

For example, the multifunctional light unit may also provide inboard light emission for cabin lighting. The light source for inboard light emission may be provided by the same light source or by a separate light source. A controllable reflection protection unit is activatable to block off inboard light emission, when required. In one example, at least one primary light source and at least one secondary light source are provided. The primary light source provides the outboard light emission, and the secondary light source provides inboard light emission. The primary and the secondary light source are controllable individually.

According to an exemplary embodiment, a control unit is provided to activate at least one parameter of the group of light color, light brightness, light intensity, and flashing or blinking frequency.

The control may be provided by wireless connection or by wire connection. For example, a bus system is provided for the lighting equipment.

In one example, the at least one light source is provided as a light band and/or light point(s) that are based on light-emitting diode technology. For example, light tube segments are provided at least along a portion of a side contour of a window opening. In one example, soft and flexible light tubes are provided.

According to an exemplary embodiment, at least one lighting surface area on the outside of the fuselage structure is provided as the multifunctional light unit.

For example, the lighting surfaces are provided by organic light-emitting diodes (OLEDs) provided below a light-transmissive outer cover layer. In one example, a plurality of OLED surfaces is provided.

According to an exemplary embodiment, as the multifunctional light unit, a plurality of lighting spots distributed across surface areas of the fuselage is provided.

For example, the lighting spots are provided as light-emitting diodes (LEDs) inserted in the outer skin, for example in form of LEDS provided in holes protected by a light-transmissive cover layer, or as ends of light-guiding fibres ending below a light-transmissive cover layer.

The lighting surfaces and/or the plurality of lighting spots can be provided in addition or alternatively to multifunctional light units integrated in window constructions as mentioned above.

According to an exemplary embodiment, at least one multifunctional light unit is provided as an adaptable graphical user interface on surfaces of at least one of the group of wing structures, vertical stabilizer, and engine housings For example, the surfaces may comprise in particular sideway facing surfaces. The wing structures comprise the main wing surfaces, such as upper and lower areas, as well as front edge surfaces and tail edges, and wing end structures, also referred to as winglets, sharklets or wingtips. The wing surfaces also comprise the surfaces of a horizontal stabilizer. The vertical stabilizer also comprises a rudder. The horizontal stabilizer also comprises an elevator.

For example, the multifunctional light unit is provided as one of the examples of the multifunctional light unit above, such as the lighting surfaces with OLEDs or integrated light spots. In another example, the multifunctional light unit is provided as a projection surface onto which light is projected and which serves as a reflecting, light providing surface visible to a user. Projection devices may be integrated into nearby fuselage structures or wing structures. For example, a projection device is provided in the horizontal stabilizer projecting light for generating graphical presentations on the vertical stabilizer. In another example, light projecting arrangements are provided to project light onto fuselage sideways surfaces. The light projecting arrangements may be arranged in the wing structures. Depending on the location, adaptable optics may be provided to compensate wing movement during operation of an aircraft.

In a further example, a combination of projection surfaces and other multifunctional light units is provided. In a still further example, a combination of different surface areas are provided as multifunctional light units.

According to a further embodiment, a method for providing visual signalling of an aircraft is provided, comprising the steps of: a) activating at least one multifunctional light unit, wherein the at least one multifunctional light unit is provided according to one of the preceding examples: b) providing at least one of the group of b1) directional signalling of the aircraft, b2) status signalling, and b3) identification signalling of the aircraft. The directional signalling relates to at least one of the group of movement of the aircraft in an airborne state, and movement of the aircraft in an on-ground state. The status signalling relates to at least one of the group of status of the aircraft, status of the current flight mission, and status of the traffic situation. The identification signalling relates to at least one of the group o type and specific model of the aircraft, operating airline, flight number, and origin and destination.

According to a further embodiment, a window of an aircraft is provided that is equipped with an integrated light source of a multifunctional light unit as described above.

According to a further embodiment, the fuselage structure comprises a plurality of windows and/or doors, and at least one of the windows and/or doors is equipped with a signature light unit provided as one of the above-described examples for the at least one multifunctional light unit. The light unit is adapted to provide signalling following at least a part of the contour of the windows and/or doors.

For example, the signalling provided by the signature light unit serves for identification purposes. The adaptability may be provided as in the multifunctional light unit. Instead, a reduced adaptability may be provided, such as switching on and off or dimming of the light source(s).

According to an example, multifunctional light units are provided as light units with adaptable graphical content, i.e. they can be activated and controlled to different modes. According to a further example, multifunctional light units are provided as light units with fixed graphical content, i.e. they can be activated or turned off.

According to a still further embodiment, the multifunctional light units may be provided for improved branding, functionality, and performance of the aircraft. For example, aircraft products, i.e. different models of aircrafts from a particular manufacturer, may be identified by specifically arranged multifunctional light units. By providing additional light units, for example integrated in the window area of cabin or cockpit windows, it is possible to provide primary light emission that is visible from outboard, while the passengers or pilots will not be disturbed. Similar is the case for additional light units provided integrally within the fuselage structure or outer skin. Thus, the multifunctional light unit, i.e. the light module, provides extended aircraft communication functionality, and, of course, also serves as a design element. By providing accentuation of aircraft contours, for example accentuating the window outlines, aircraft transport vehicles can be identified. Further, the design element of the multifunctional light units can also be applied for airline differentiation. One of the advantages is the increase in safety by additionally applicable light modules, for example, in case of darkness, and large distances to the aircraft. Thus, the aircraft can be located and identified in an improved way. The aircraft fuselage can be recognized by wide application of light modules with its position and direction. Additional communication and visualization potentials between aircrafts, or between and aircraft and airport staff, or tower staff and airfield staff to aircraft is based on an optimized communication interface of a human interface, for example in case of an ongoing or intended and indicated change of aircraft direction. This function increases safety and ensures coordination of aircrafts into a disproportionately growing flight inventory in relation to the available operating range in airspace and on ground. The multifunctional light units also provide localization and controlling functions. For example, initiated by a remote control, localization and controlling functions may be started. For example, this enables ground/airfield staff and flight captain or flight crew members to perform additional aircraft checks. Various operator modes and light scenarios can be converted with the above described light module technology. Functions are conceivable such as flashing, sparkle, dimming and the like, and light effects such as symbols, patterns, indication, letters, and the like. For example, systematic light band and/or light spot actuating is provided. Based on a specific controller and cable harness architecture, these functionalities can be provided by specific customer software. This allows a facilitated and economically improved solution for customer's differentiation, i.e. airlines differentiation. The integration of the above described technology can be provided for existing aircraft fleets, i.e. as retrofit, because aircraft windows are changed frequently, for example about every two or three years. The retrofit does not require structural changes or adaption of the fuselage. The embodiment provides a rather major external effect for an innovative aircraft and allows differentiation in aircraft competition, achieved with a rather reduced technical solution, also by providing a reduced energetic impact, minimized weight impact and only small installation space, in particular with LED application.

These and other aspects of the present embodiment will become apparent from and be elucidated with reference to the embodiments described hereinafter.

BRIEF DESCRIPTION OF THE DRAWINGS

Exemplary embodiments of the embodiment will be described in the following with reference to the following drawings.

DETAILED DESCRIPTION

Figure 1:
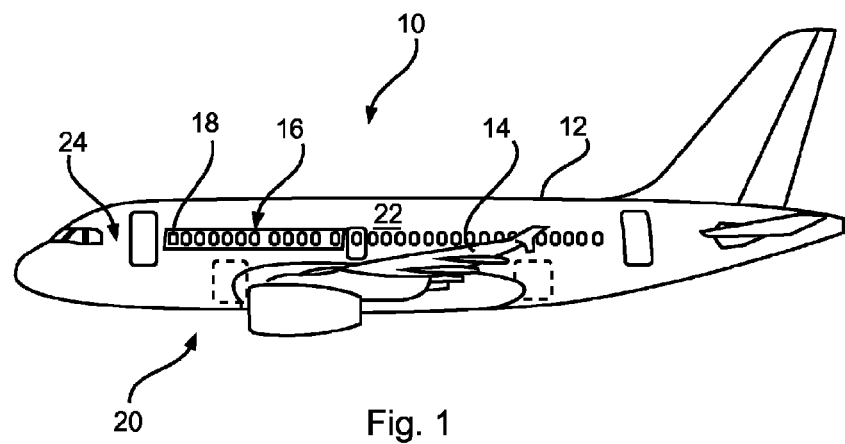
FIG. 1 is a schematic setup of an aircraft providing visual signalling in an isometric view.

FIG. 1 shows an aircraft 10, comprising a fuselage structure 12 and a wing structure 14 attached to the fuselage structure 12. At least one multifunctional light unit 16 is provided, comprising at least one light source 18 for outboard light emission. The multifunctional light unit 16 is provided on sideway facing areas, such as sideway areas 20 of the fuselage structure 12. The sideway facing areas comprise lateral sideway facing surface areas and/or forward and backwards facing surface areas. For example, the sideway areas 20 comprise lateral sideway surface areas 22, and/or nose-tip sideway areas 24 of the fuselage structure 12. The at least one multifunctional light unit 16 is configured to provide at least one of the group of: i) directional signalling of the aircraft, relating to at least one of the group of movement of the aircraft in an airborne state, and movement of the aircraft in an on-ground state; ii) status signalling of the aircraft, relating to at least one of the group of status of the aircraft, status of the current flight mission, and status of the traffic situation; and iii) identification signalling of the aircraft, relating to at least one of the group of type and specific model of the aircraft, operating airline, flight number, and origin and destination. For the "directional signalling", the "status signalling", and the "identification signalling", the reader is kindly referred to the respective descriptions above, which are also applicable for the embodiments shown in the figures.

Figure 2:
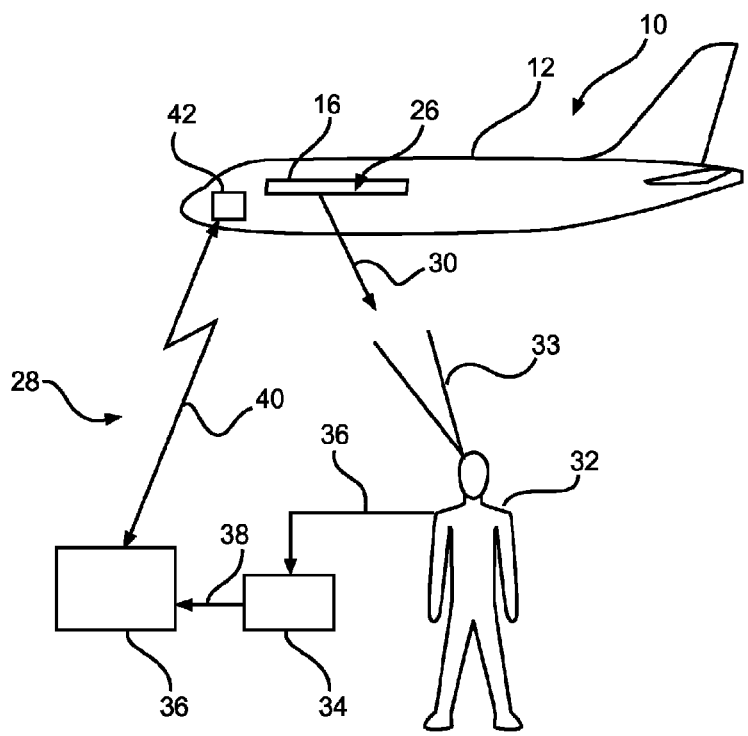
FIG. 2 is a further schematic setup of an aircraft with a human-machine-interface.

FIG. 2 shows an example, where the sideway facing areas of the aircraft, e.g. the sideway areas 20 of the fuselage structure 12, with the at least one multifunctional light unit 16 provide an adaptable graphical user interface 26 as a communication interface of a human-machine-interface 28 of the aircraft for providing information exchange between the aircraft and a user located outside the aircraft.

The sideways facing areas of the aircraft comprise window areas of the fuselage structure. The window areas comprise cabin and/or cockpit windows and areas between adjacent windows and adjacent areas below and above the windows.

For example, the multifunctional light unit 16 provides visual information, indicated with a first arrow 30, which is then perceived by a user 32, wherein the information perception by the user is indicated with a fan-like structure 33. For communicating with the aircraft, the user 32 can provide commands or control functions or instructions to a user interface 34, wherein a second arrow 36 indicates the provision of the respective commands or instructions. The user interface 34 is connected to a control unit 36 and provides the respective data via a first data connection 38. The control unit 36 is in communicating connection, indicated by an arrow 40, with an onboard control unit 42 of the aircraft 10. For example, the user 32 receives certain travelling indication information, for example provided by the pilots in the cockpit via the multifunctional light unit(s), and the user 32 can then give feedback via the communication connection 40 to the control unit 42 onboard the aircraft, providing the respective information to the pilots.

The human-machine-interface 28 may have more than one user watching the aircraft and perceiving the information. For example, operating staff, such as pilots are users when activating the multifunctional light units are users, even when sitting inside the aircraft. Further, the multifunctional light units are provided on board of unmanned aircraft for providing the above described signalling.

Figure 3:
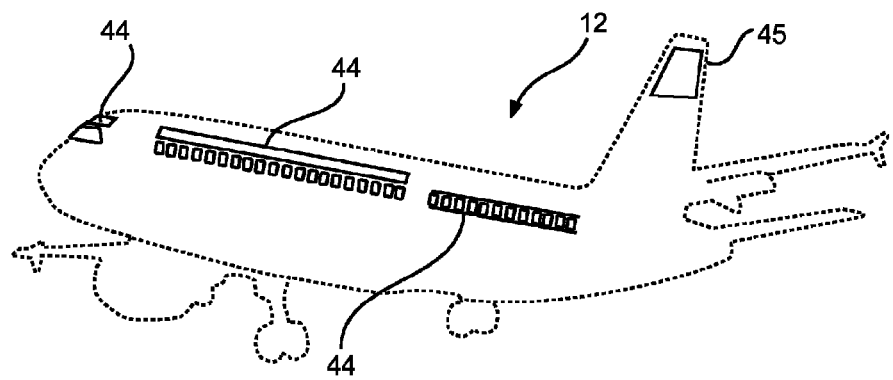
FIG. 3 is an example of an aircraft with multifunctional light units as lighting surface areas.

The following figures, i.e. FIG. 3, as well as FIG. 4, FIG. 5, FIG. 6, and FIGS. 7A and 7B, show the aircraft outline with dotted lines indicating a reduced or poor visibility of the aircraft itself, for example in dark environments such as during night or evening hours. As can be seen, by providing multifunctional light units, in different embodiments, additional information is provided to the outside.

FIG. 3 shows a further embodiment of an aircraft, wherein as the multifunctional light units 16, lighting surface areas 44 are provided on the outside of the fuselage structure 12. For example, they can be provided above a window arrangement, as shown in the front part of the fuselage, i.e. in the left half of the image, or between windows, as shown in the rear part, or right part of the drawing. In another example, the lighting surface areas 44 are provided below the windows. Of course, combinations thereof can be provided. As a further example, the lighting surface areas can also be provided in the nose tip area of the aircraft. For example, the lighting surface areas 44 are provided as organic light-emitting diodes, for example provided below a light-transmissive outer cover layer. Lighting surface areas 45 may also be provided in the tail portion of the aircraft, e.g. on the vertical stabilizer, for example alternative or in addition to the arrangement on the fuselage.

Figure 4:
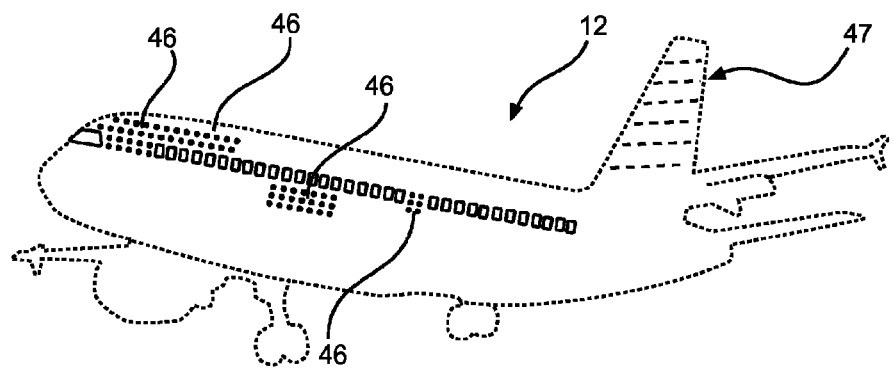
FIG. 4 is a further example of an aircraft with multifunctional light units provided as a plurality of lighting spots.

FIG. 4 shows a further embodiment of the aircraft 12, wherein as multifunctional light units 16, a plurality of lighting spots 46 is provided, distributed across surface areas of the fuselage. For example, the lighting spots are provided as LEDs inserted in the outer skin, for example below a protective light-transmissive cover layer. The LEDs can be provided in small holes in the outer skin material, and thus be combined to provide the effect of a light surface area. Lighting spots 47 may also be provided in the tail portion of the aircraft, e.g. on the vertical stabilizer, for example alternative or in addition to the arrangement on the fuselage.

Figure 5:
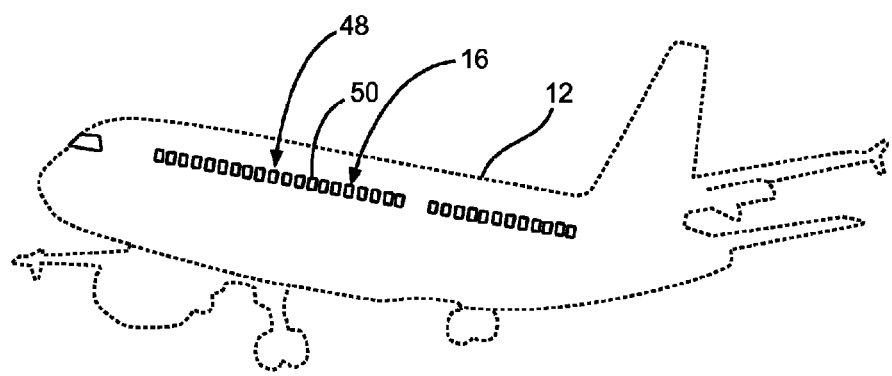
FIG. 5 is a further example of an aircraft, where a number of windows are provided with at least one multifunctional light unit.

FIG. 5 shows a further embodiment of the aircraft 12, wherein the fuselage structure 12 is provided with a plurality of 48 of windows 50. At least one of the windows is provided with the at least one multifunctional light unit 16. For example, as shown, all cabin windows, as well as the cockpit window, are equipped with the multifunctional light unit 16. Of course, a reduced number of windows are equipped with multifunctional light units 16 in another example (not shown). Further, the fuselage structure 12 is provided with one or more doors, and one or more of the doors is provided with one or more multifunctional light units 16.

FIG. 5 shows the multifunctional light units providing status signalling of the aircraft, as described above. The status can be a colour code, a blinking code or an illumination-blinking code.

Figure 6:
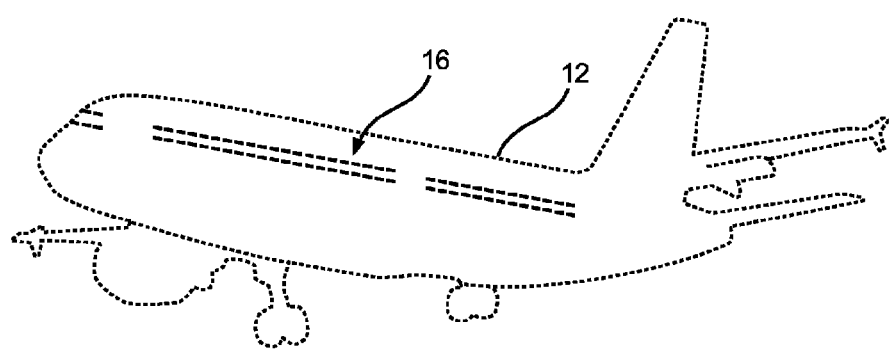
FIG. 6 is a further example of windows with multifunctional light units.

FIG. 6 shows a further embodiment where the multifunctional light units provide identification signalling of the aircraft, as described above.

Figure 7A:
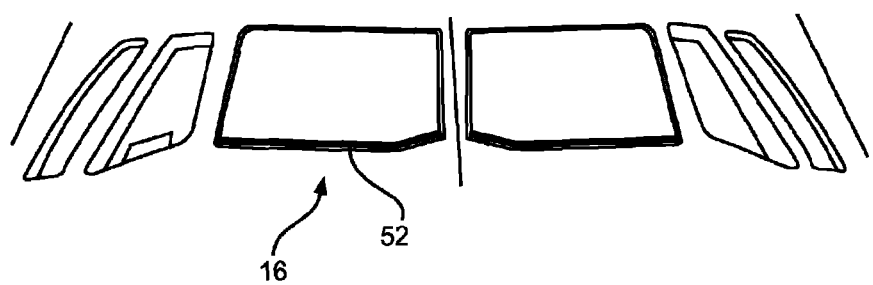
FIG. 7 is further examples of multifunctional light units provided integrally with cockpit windows in FIG. 7A and FIG. 7B.
Figure 7B:
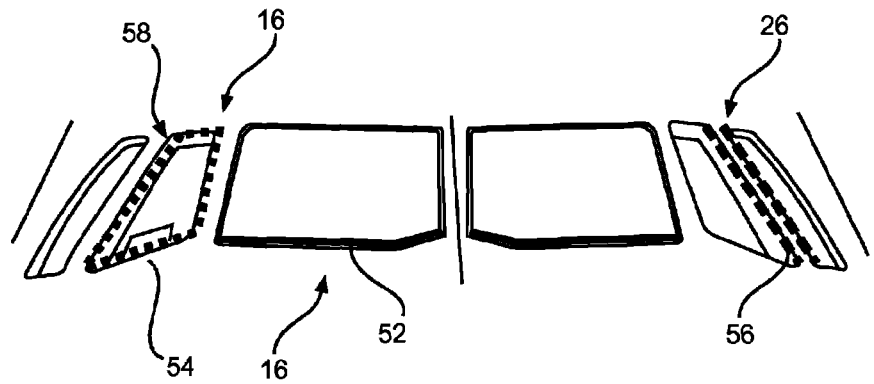

According to the embodiment shown in FIGS. 7A and 7B, the multifunctional light units 16 provide directional signalling, as described above. For example, the illumination of lower contour lines 52 of the front cockpit windows, as shown in FIG. 7A, may provide a so-called signature signalling to indicate corporate identity. The illumination of lower contour lines 52 of the front cockpit windows may also indicate one before-mentioned signalling, i.e. directional signalling, status signalling, and identification signalling, for example movement indication information. The embodiment in FIG. 7B shows further possibilities to provide directional signalling, or other signalling, for example by flashing the starboard side cockpit window, i.e. the respective outline or contour in a first colour 54, for example in green, while the respective counterpart, i.e. the side window of the cockpit on the other side, is provided with a different pattern 56, provided by the respective multifunctional light unit 16. It is noted that FIG. 7A and FIG. 7B show a section of a front view of an aircraft where only the cockpit window area is shown.

Of course, it is also possible to combine the provision of directional signalling, status signalling and identification signalling (not further shown).

According to a further embodiment, as already indicated in FIGS. 7A and 7B, the at least one multifunctional light unit 16 is provided following at least a part of a contour 58 of the respective window. For example, this is provided for cabin windows, and/or for cockpit windows, as shown in FIGS. 7A and 7B.

The term "sideway areas" comprises the portions of a fuselage that are facing in a direction which has at least a small horizontal component in its orientation, for example with an inclination f at least +/−15° from the horizontal plane, when the aircraft is in its normal parking position on a horizontal airfield, for example.

Thus, the sideway areas not only comprise windows of the cabin facing to port and starboard, but also cockpit windows facing to front port and front starboard. Further, the sideway areas also comprise cockpit windows facing in the flight direction, i.e. facing approximately in the longitudinal direction of the aircraft, such as the tow middle or centre windows of FIGS. 7A and 7B. In case of cabin space located in the aircraft's front end, similar is the case for cabin windows facing in directions similar as cockpit windows.

Figure 8A:
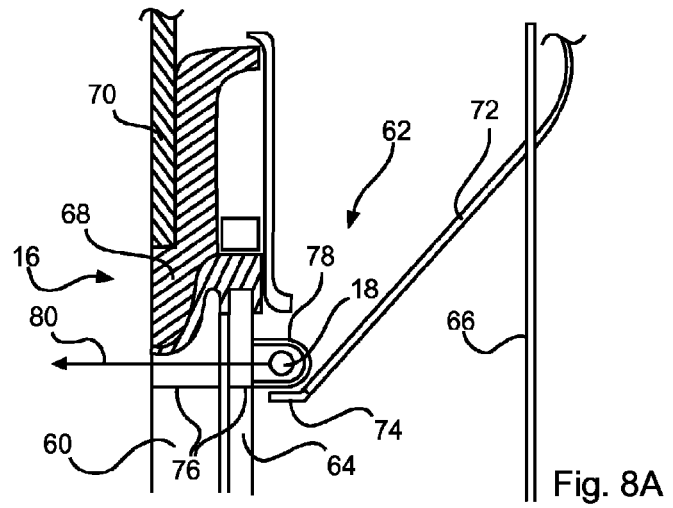
FIG. 8 is a detailed cross-section of a window with an integrated multifunctional light unit in three examples in FIG. 8A, FIG. 8B, and FIG. 8C.
Figure 8B:
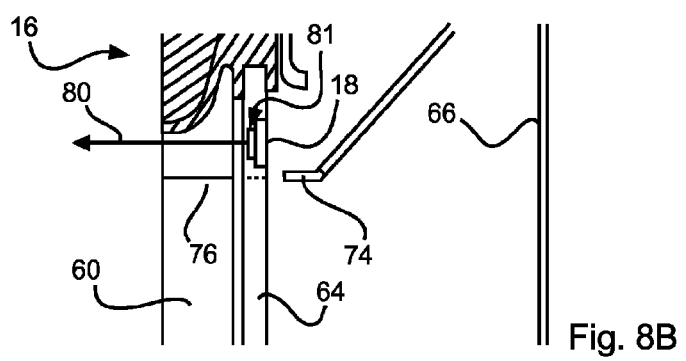
Figure 8C:
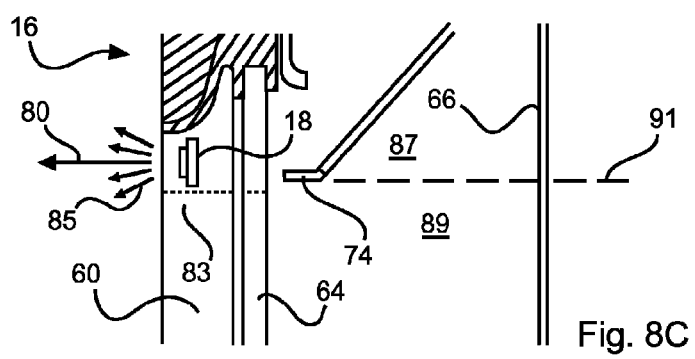

According to further embodiments, shown in FIG. 8, the multifunctional light unit 16 is integrated in a window construction, and there may be provided different positioning of the light source in relation to the windowpanes. The cross-section shown in FIGS. 8A, 8B and 8C shows an outer windowpane 60 on the left, followed by a further windowpane 64. For example, the outer windowpane 60 is provided to withstand the pressure difference between the cabin and the outside environment and to provide protection from the environmental conditions in form of, for example, rain and moisture, besides the low pressure. The outer windowpane 60 and the further windowpane 64 provide an insulating effect by enclosing an intermediate space. For pressure compensation, a little hole in the further windowpane 64 may be arranged. The two windowpanes 60, 64 are followed by a further third windowpane 66 facing towards the cabin, acting as a protection pane for the second windowpane 64. The windowpanes are connected to a frame 68, which is mounted to the outer skin 70 and thus the fuselage structure. Further, a window funnel 72 is provided with an increasing opening size in direction of the cabin space. A further cover or sealing part 74 is provided, for example as a continuation of the funnel 72. The light source 18 is provided behind the outer windowpane 60.

As an additional function, with respect to cabin windows, the light source provided integrated in the window construction may also serve as a source for thermal energy for reducing the formation of condensate on the surfaces of the middle pane or on the surface of the inner pane facing away from the cabin, also known as foggy or iced windows. Even a small amount of heat generation by a light source may be sufficient to allow a higher degree of relative humidity in the cabin space. The "heat" provided by the light source is used to warm up the air between the windowpanes.

The light source, for example light emitting diodes (LEDs), or other suitable light sources, may be provided integrated within the window setup, for example integrated between the outer and middle windowpane.

The light source may be provided integrated within one of the windowpanes, for example integrated in the outer or middle windowpane. The light source may be at least partly inserted in the windowpane element. In a further embodiment, the light source is completely inserted in the windowpane element. In still a further embodiment, the light source is fully integrated by providing the electronic circuitry during the production of the windowpane. For example, before molding the windowpane, at least one LED circuitry is provided without the usual embedding structure forming housing and lens structure, but the windowpane is provided as mass encapsulating the circuitry and thus forming housing or body structure of an LED. Thus, a windowpane made from a homogenous material can be provided.

The light source may be provided integrated within a window frame portion.

Figure 9:
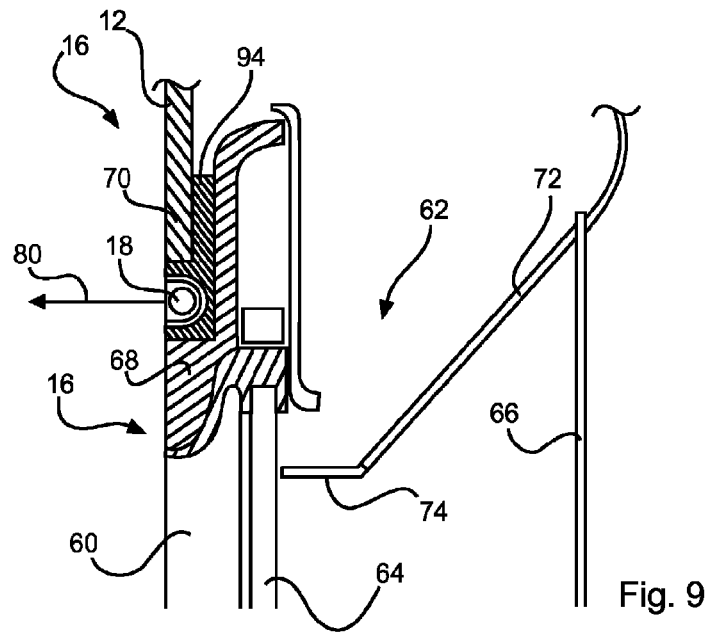
FIG. 9 is a further cross-section of a window with an intermediate frame structure provided with a multifunctional light unit.
Figure 10:
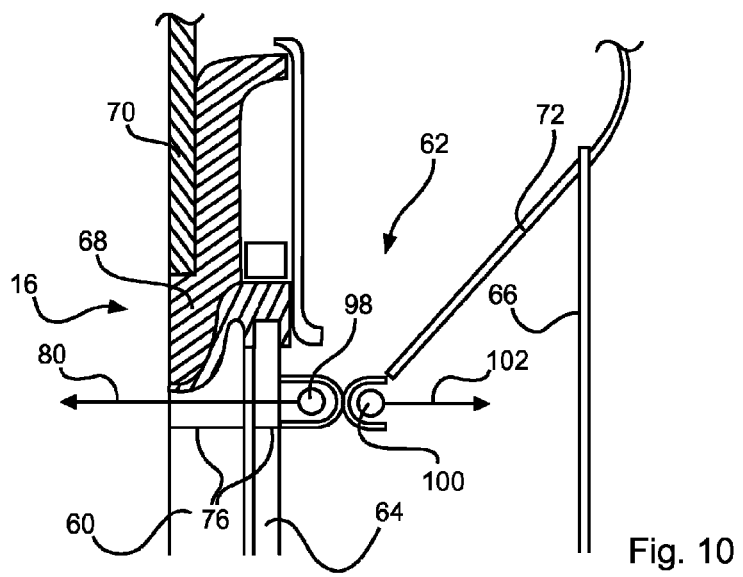
FIG. 10 is a cross-section of a further example of a window with a multifunctional light unit.
Figure 11:
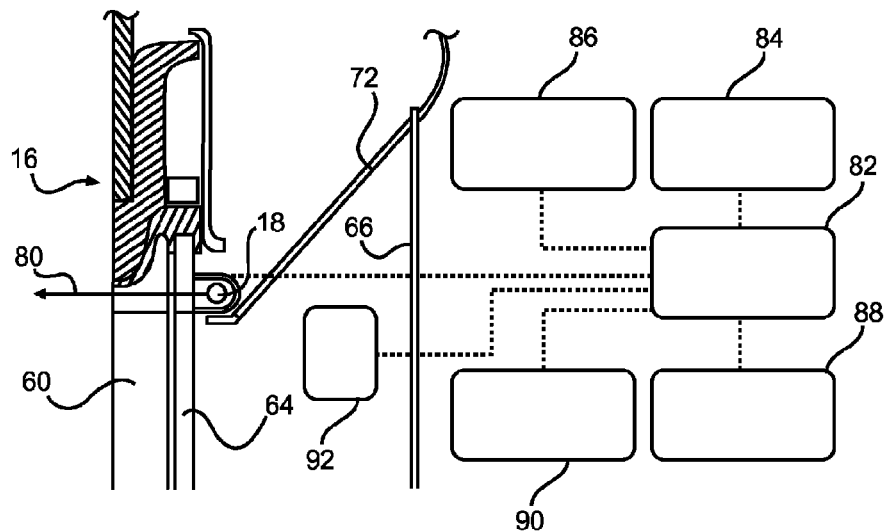
FIG. 11 is a further example of a cross-section of a window with a multifunctional light unit in relation to other functional elements.

It must be noted that FIG. 8A, as well as FIGS. 9, 10 and 11 show the light source 18 as a circle representing an abstract indication of a light source. The light source may of course have different forms, such as light bulbs, light tubes, light rings, LEDs, LED arrays and the like. Further, optics or optical elements such as lenses, grids, reflectors and the like, may be provided in addition to the light source (not shown in detail).

In a first embodiment, shown in FIG. 8A, the at least one light source 18 is provided behind the further, or middle windowpane 64, wherein the at least one light source 16 is provided in a circumferential frame area 62. As can be seen in FIG. 8A, the light source 18 is provided integrated behind the funnel 72. The sealing part 74 may connect the funnel 72 with a light convey barricade 76, which can be provided optionally. The light convey barricade 76 serves for light reflection to prevent light from the multifunctional light unit being reflected towards the passenger. The light convey barricade 76 may be provided as a holographic structure in the windowpane panel element. Also, other optically effective structures may be provided such as changes in material properties to provide a differing refraction index. Further, reflector means 78 are provided in the vicinity of the light source 18. The reflectors, such as the reflector means 78 or the light convey barricade 76, are provided for preventing inboard light emission.

As light conveyance barricade 76, a sealing, for example an elastic sealing is provided between the outer and the middle windowpane, for example for preventing unwanted back reflection of signalling light towards the passenger. An arrow 80 indicates outdoor light emission through the second windowpane 64 and the outer, i.e. first windowpane 60.

In a second embodiment, shown in FIG. 8B, the at least one light source 18 is provided integrated in the middle windowpane 64. For example, an LED array 81 is provided. In another example (not shown in detail), an LED array is provided between the outer windowpane 60 and the middle windowpane 64.

For an improved visibility from different directions, a diffuser can be provided in the vicinity of the outer covering pane, for example on the inside of the outer window 60 (not shown in detail).

In a third embodiment, shown in FIG. 8C, the at least one light source 18 is provided integrated inside the outer windowpane 60. For example, the pane can be provided with a slightly increased thickness to allow an at least partial insertion of LEDs of an LED array 83 into the window/glazing element. LEDs can be configured to provide light emission in different directions 85, for example as directed light bundles or as diffuse light emission.

In a further embodiment, the inner windowpane is provided with a filtering effect for a selected light wavelength range, such as a filter layer on the side facing away from the passenger. Instead of or in addition, the middle windowpane is provided with a filtering effect, depending on the location of the light source. For example, the multifunctional light units provide visual signalling in a predetermined wavelength range. In case of light being reflected by the outer or middle window, this particular light spectrum is filtered by the inner windowpane. Thus, the signalling light is not visible to the passenger inside the cabin. The filtering effect of the window may also be used for providing certain coloured ambient light in the cabin, since the light spectrum is somewhat manipulated by the filter effect. For example, red light spectrum is used for the signalling, and the filter effect leads to a blue(r) ambient cabin light provided by the daylight entry through the window.

In a further embodiment, the inner windowpane (and/or middle windowpane) is provided with a selective reflecting effect, or selective reflection and thus also filtering effect for a selected light wavelength range. A light source can provide light with a predetermined light spectrum. A geometrically small, but powerful, light source emits light onto the windowpane which reflects the light to the outside of the aircraft, thus providing a geometrically larger light emitting area.

In a further embodiment, the light source emits light in a predetermined range not only to a selectively reflective layer, but also directly towards the exterior to be directly visible.

In a still further embodiment, the light source is arranged such that it can be seen by the passenger. However, the light generated is provided as invisible light waves, wherein "visible" relates to the visibility by a human eye. A conversion device is provided, where the invisible light waves are transformed into signalling light visible from the outside of the aircraft. Hence, visible light is emitted. The conversion device is arranged such that the visible light, which is provided by the conversion device, is not visible to the passenger inside the cabin. The conversion device may be a reflecting coating on the outer surface of a windowpane, such as the middle or inner windowpane.

With respect to the passenger looking outside the aircraft through the cabin window, a first window area 87 is provided where the window itself is visible, as well as a second window area 89 where the window itself is not visible. A separating line 91 is shown for further illustration. It is noted that the separation of course also depends on the user's viewpoint or position. Nevertheless, in the first window area, the construction is hidden from direct view by the user. The light source of the multifunctional light unit may be provided in this first window, i.e. in the window covered by the first window area, such that the light emission is not visible from the inside of the cabin. Hence, if the light source is arranged in the second window area 89, additional measurements may be provided for preventing any unwanted light mission towards a passenger in the cabin, or a pilot in the cockpit.

The transparent windowpanes may be made of glass material or plastic material, such as acrylic glass, also known under the trademark Plexiglas.

As shown in FIG. 9, an embodiment is shown having an intermediate frame structure 94 between the fuselage structure 12 and a window frame 96. The multifunctional light unit 16, i.e. the light source 18 is provided in the intermediate frame structure 94. For example, a light source is provided protected by a cover. In another example, not further shown, a layer comprising OLED structures is provided on the intermediate frame structure 94. The OLED may be provided on one or more side portions (left/right/top/bottom) of the window, or may be provided circumferentially, thus tracing the window's shape. A protection cover may be arranged on the OLED structure.

In another embodiment, a layer comprising OLED structures is provided on the frame 68. In a still further embodiment, a layer comprising OLED structures is provided on the fuselage's outer skin, for example as graphic elements surrounding the window, i.e. window frame.

According to yet another embodiment, the multifunctional light unit 16 provides also inboard light emission for cabin lighting. For example, as shown in FIG. 10, at least one primary light source 98 is provided, and at least one secondary light source 100. The primary light source 98 provides the outboard light emission 80. The secondary light source 100 provides inboard light emission 102. The primary and the secondary light sources 98, 110 may be provided to be controllable individually.

According to a further embodiment, not shown, a control unit is provided to activate at least one parameter of the group of light colour, light brightness, light intensity, flashing frequency, or blinking frequency.

FIG. 11 is a functional diagram together with the above described cross-section. The light source 18 is provided with an internal/external controller 82. Further, a power supply 84 may be provided, for example by the aircraft cabin systems. As an addition, or as an alternative, a solar collector 86 may be connected to the controller 82. Further, as an option, a communication frame 88 indicates the wire and/or wireless technology to affected aircraft systems, for example the cockpit and/or the cabin. As a further option, an energy storage 90 may be provided. As a still further option, an optical sensor for daylight detection may be provided, as indicated with a further frame 92. It must be noted that although FIG. 11 shows a particular embodiment for the light source, also other embodiments of the light source, e.g. according to one of the above-described examples, may be provided in combination with the components shown in FIG. 11.

Figure 12:
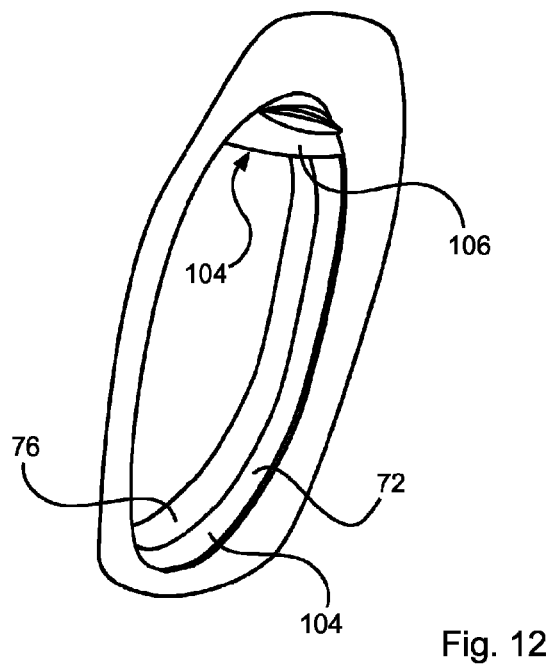
FIG. 12 is a perspective view of a further example of a window with a multifunctional light unit.

FIG. 12 shows a perspective view of a cabin window with an integrated multifunctional light unit. A photovoltaic element 104 may be provided and integrated in the window construction for energy supply of the multifunctional light unit, the latter being hidden behind the light convey barricade 76. For example, the photovoltaic element is provided on the window funnel 72, for example in the lower portions, or is provided on the rear side of a blind or window shade 106.

Figure 13A:
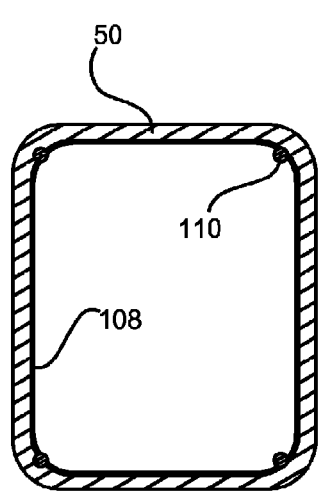
FIG. 13 shows further examples of a window with integrated multifunctional light unit in FIGS. 13A, 13B, and 13C.
Figure 13B:
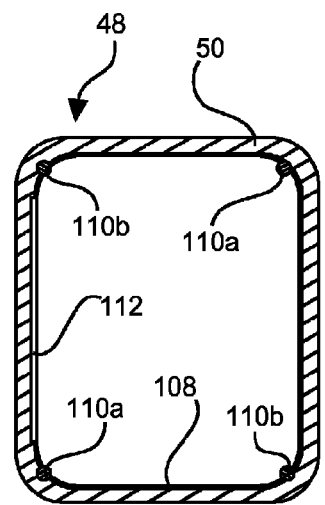
Figure 13C:
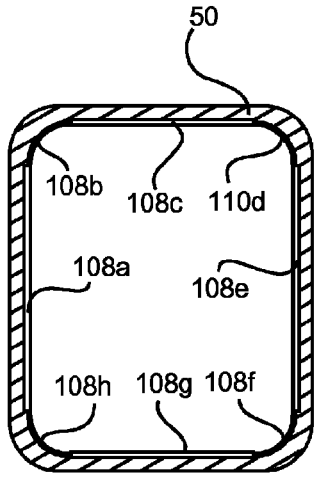

FIG. 13 are schematic diagrams illustrating setups for allowing different visualizations of directional signalling, status signalling, or identification signalling. FIG. 13A shows a first embodiment with a light band 108, for example following the contour of a window. Further, light points 110 are shown in the corner portions of the window. FIG. 13B shows the light band 108 with a separate portion 112, for example on the left vertical part. Further, the light points 110 are provided as first light points 110a in a first colour and second light points 110b in a second colour. FIG. 13C shows an example of a light band 108 with different, i.e. individual light band segments, for example segments 108a to 108h.

Figure 14:
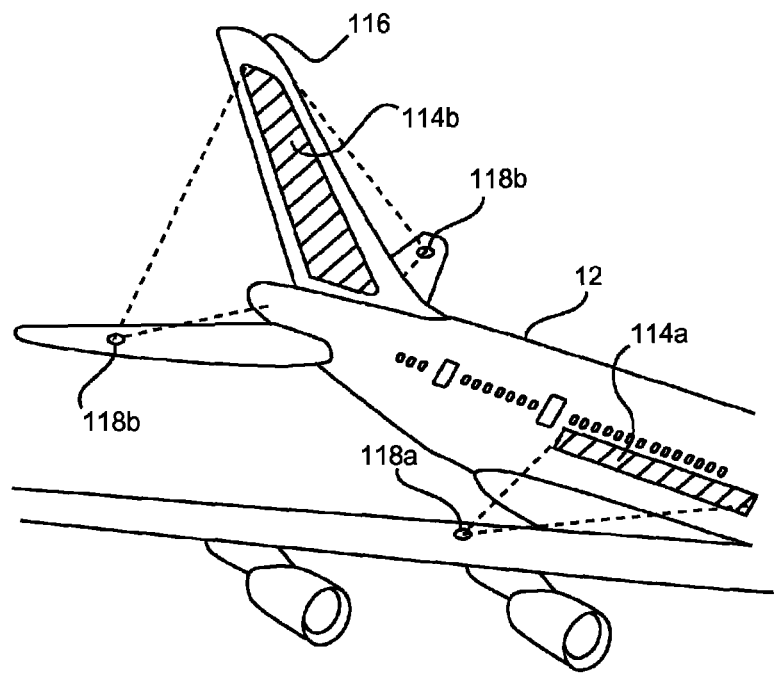
FIG. 14 shows a further example of a light projecting multifunctional light unit in relation with a tail portion of an aircraft.

FIG. 14 shows a perspective view of a tail portion of an aircraft. As one example for multifunctional light units, light projections 114 are provided, such as a light projection 114a on the fuselage 12 and/or a light projection 114b on the tail portion, i.e. on a vertical stabilizer 116. The light projections 114 are generated by projecting devices 118 located such that the light can be projected onto reflecting surfaces on the aircraft. For example, projecting devices 118a are provided integrated into a wing's outer skin on the upper side, and/or as projecting devices 118b integrated into the horizontal stabilizer's outer skin on the upper side. The projecting devices 118 may comprise a lens or lens system or other optical systems. The light projection provides one or more of the before-mentioned signalling, i.e. directional signalling, status signalling, and identification signalling.

Figure 15:
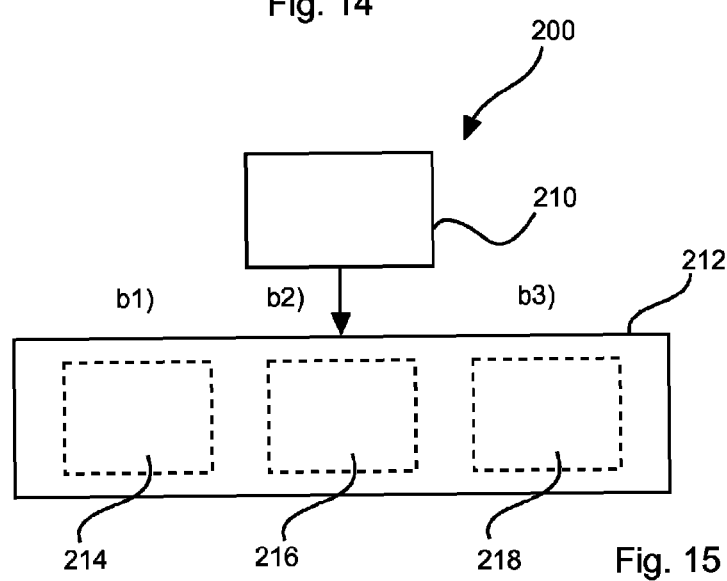
FIG. 15 shows basic steps of an example of a method for providing visual signalling of an aircraft.

FIG. 15 shows a method 200 for providing visual signalling of an aircraft. In a first step 210, at least one multifunctional light unit is activated, wherein the at least one multifunctional light unit is provided according to one of the above mentioned examples. In a second step 212, there is provided at least one of the group of the following signalling: In a first sub-step 214, directional signalling of the aircraft is provided, relating to at least one of the group of movement of the aircraft in an airborne state, and movement of the aircraft in an on-ground state. In a second sub-step 216, status signalling of the aircraft is provided, relating to at least one of the group of status of the aircraft, status of the current flight mission, and status of the traffic situation. In a third sub-step 218, identification signalling of the aircraft is provided, relating to at least one of the group comprising a type and specific model of the aircraft, operating airline, flight number, and origin/destination.

The first step 210 is also referred to as step a), and the second step 212 as step b). Following, the first sub-step 214 is also referred to as step b1), the second sub-step 216 as step b2), and the third sub-step 218 as step b3). As indicated by the dotted lines in FIG. 15, the three sub-steps 214, 216, and 218 can be provided alternatively or in addition to each other in various combinations. The substeps may also be provided at different times, the same times or overlapping time intervals.

It has to be noted that embodiments of the embodiment are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the embodiment has been illustrated and described in detail in the drawings and foregoing description, such illustration and description are to be considered illustrative or exemplary and not restrictive. The embodiment is not limited to the disclosed embodiments. Other variations to the disclosed embodiments can be understood and effected by those skilled in the art in practicing a claimed embodiment, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment has been presented in the foregoing detailed description of the embodiment, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment of the embodiment, it being understood that various changes may be made in the function and arrangement of elements described in an exemplary embodiment without departing from the scope of the embodiment as set forth in the appended claims and their legal equivalents

What is claimed is:

1. An aircraft for providing visual signalling, comprising:
a plurality of multifunctional light units provided on sideway facing areas of the aircraft, each of the multifunctional light units comprising at least one light source for outboard light emission;
the sideway facing areas comprising at least one of the group of: lateral sideway facing surface areas and forward and backwards facing surface areas of the aircraft; and
a combination of the multifunctional light units is configured and controlled to provide identification signalling of the aircraft, wherein the identification signalling visually indicates at least one of the group of: type and specific model of the aircraft, operating airline, flight number, and destination and origin;
wherein the aircraft has a fuselage structure, and wherein the visual signalling is provided on the outside of the fuselage structure of the aircraft;
wherein the fuselage structure is provided with a plurality of windows, each of the windows provided with one of the multifunctional light units in the combination;
wherein each multifunctional light unit in the combination is integrated in a respective window construction of the aircraft;
wherein the at least one light source of each multifunctional light unit in the combination is provided behind an outer windowpane of the window construction;
wherein the at least one light source of each multifunctional light unit in the combination is provided in a circumferential frame area of the window construction;
wherein each multifunctional light unit in the combination follows an outline contour of a respective window construction; and
wherein a first number of the plurality of multifunctional light units are arranged on a first side of a longitudinal axis of the aircraft, and a second number of the plurality of multifunctional light units are arranged on a second side of the longitudinal axis of the aircraft.

2. Aircraft according to claim 1, wherein the sideway facing areas of the aircraft with the at least one multifunctional light unit provide an adaptable graphical user interface as a communication interface of a human-machine-interface of the aircraft for providing information exchange between the aircraft and a user located outside the aircraft.

3. Aircraft according to claim 1, wherein the information provided by the visual signalling is perceptible on the outer surface of the fuselage structure.

4. Aircraft according to claim 1,
wherein the sideway facing areas of the aircraft are sideway areas of the fuselage structure; and wherein the sideway areas comprise at least one of the group of: lateral sideway facing surface areas and nose-tip sideway areas of the fuselage structure;
wherein the sideway facing areas of the aircraft are window areas of the fuselage structure; and
wherein the window areas comprise at least one of the group of: cabin and cockpit windows and areas between adjacent windows and adjacent areas below and above the windows.

5. Aircraft according to claim 1, wherein the fuselage structure is provided with a plurality of doors; and
wherein at least one of the doors is provided with at least one of the at least one multifunctional light unit.

6. Aircraft according to claim 1, wherein an intermediate frame structure is provided between the fuselage structure and a window frame; and
wherein the multifunctional light unit is provided in the intermediate frame structure.

7. Aircraft according to claim 6, wherein reflector means are provided for preventing inboard light emission.

8. Aircraft according to claim 1, wherein a control unit is provided to activate at least one parameter of the group of:
light colour;
light brightness/intensity; and
flashing/blinking frequency.

9. A method for providing visual signalling of an aircraft, comprising the steps of:
activating a plurality of multifunctional light units; and
controlling operation of the plurality of multifunctional light units to provide
identification signalling of the aircraft, wherein the identification signalling visually indicates at least one of the group of: type and specific model of the aircraft, operating airline, flight number, and destination and origin;
wherein the fuselage structure is provided with a plurality of windows;
wherein each of the windows is provided with one of the plurality of multifunctional light units;
wherein each of the plurality of multifunctional light units is integrated in a respective window construction;
wherein the at least one light source of each multifunctional light unit is provided behind an outer windowpane of the respective window construction;
wherein the at least one light source of each multifunctional light unit is provided in a circumferential frame area of the respective window construction
wherein each multifunctional light unit follows an outline contour of the respective window construction; and
wherein a first number of the plurality of multifunctional light units are arranged on a first side of a longitudinal axis of the aircraft, and a second number of the plurality of multifunctional light units are arranged on a second side of the longitudinal axis of the aircraft.

10. Aircraft according to claim 1, wherein the at least one multifunctional light unit is provided following at least a part of a contour of the respective window.

11. The aircraft according to claim 1, wherein another combination of the multifunctional light units is configured and controlled to provide directional signalling of the aircraft, wherein the directional signalling visually indicates at least one of the group of: direction of movement of the aircraft in an airborne state, and direction of movement of the aircraft in an on-ground state.

12. The aircraft according to claim 1, wherein another combination of the multifunctional light units is configured and controlled to provide status signalling of the aircraft, wherein the status signalling visually indicates at least one of the group of: status of the aircraft, status of a current flight mission, and status of a traffic situation.

13. An aircraft system for providing visual signalling, the aircraft system comprising:

a first plurality of multifunctional light units arranged on a first side of a longitudinal axis of the aircraft; and
a second plurality of multifunctional light units arranged on a second side of the longitudinal axis of the aircraft;
wherein each multifunctional light unit of the first plurality of multifunctional light units and the second plurality of multifunctional light units comprising at least one light source provided on sideway facing areas of the aircraft for outboard light emission, the sideway facing areas comprising at least one of the group of: lateral sideway facing surface areas, forward facing surface areas, and backwards facing surface areas of the aircraft;
wherein a first combination of the multifunctional light units is configured and controlled to provide status signalling of the aircraft, wherein the status signalling visually indicates at least one of the group of: status of the aircraft, status of a current flight mission, and status of a traffic situation;
wherein a second combination of the multifunctional light units is configured and controlled to provide identification signalling of the aircraft, wherein the identification signalling visually indicates at least one of the group of: type and specific model of the aircraft, operating airline, flight number, and destination and origin;
wherein the aircraft has a fuselage structure, and the visual signalling is provided outside the fuselage structure;
wherein the fuselage structure is provided with a plurality of windows, each of the windows provided with at least one of the multifunctional light units;
wherein each multifunctional light unit is integrated in a respective window construction;
wherein the at least one light source of each multifunctional light unit is provided behind an outer windowpane of a respective window construction;
wherein the at least one light source of each multifunctional light unit is provided in a circumferential frame area of a respective window construction; and
wherein each multifunctional light unit follows an outline contour of a respective window construction.

14. The aircraft according to claim 1, wherein:
a first group of the plurality of multifunctional light units are integrated in cockpit windows of the aircraft; and
a second group of the plurality of multifunctional light units are integrated in passenger cabin windows of the aircraft.

15. The aircraft according to claim 13, wherein:
a first group of the plurality of multifunctional light units are integrated in cockpit windows of the aircraft; and
a second group of the plurality of multifunctional light units are integrated in passenger cabin windows of the aircraft.

* * * * *